Nov. 25, 1941.  A. H. GOETZ ET AL  2,263,624
SLAT WASHING MACHINE
Filed June 22, 1938    8 Sheets-Sheet 1

Nov. 25, 1941.  A. H. GOETZ ET AL  2,263,624
SLAT WASHING MACHINE
Filed June 22, 1938   8 Sheets-Sheet 3

Inventors:
Alvin H. Goetz and
Howard H. Stevenson,
By Tefft & Tefft
Attorneys.

Nov. 25, 1941.　　A. H. GOETZ ET AL　　2,263,624
SLAT WASHING MACHINE
Filed June 22, 1938　　8 Sheets-Sheet 4
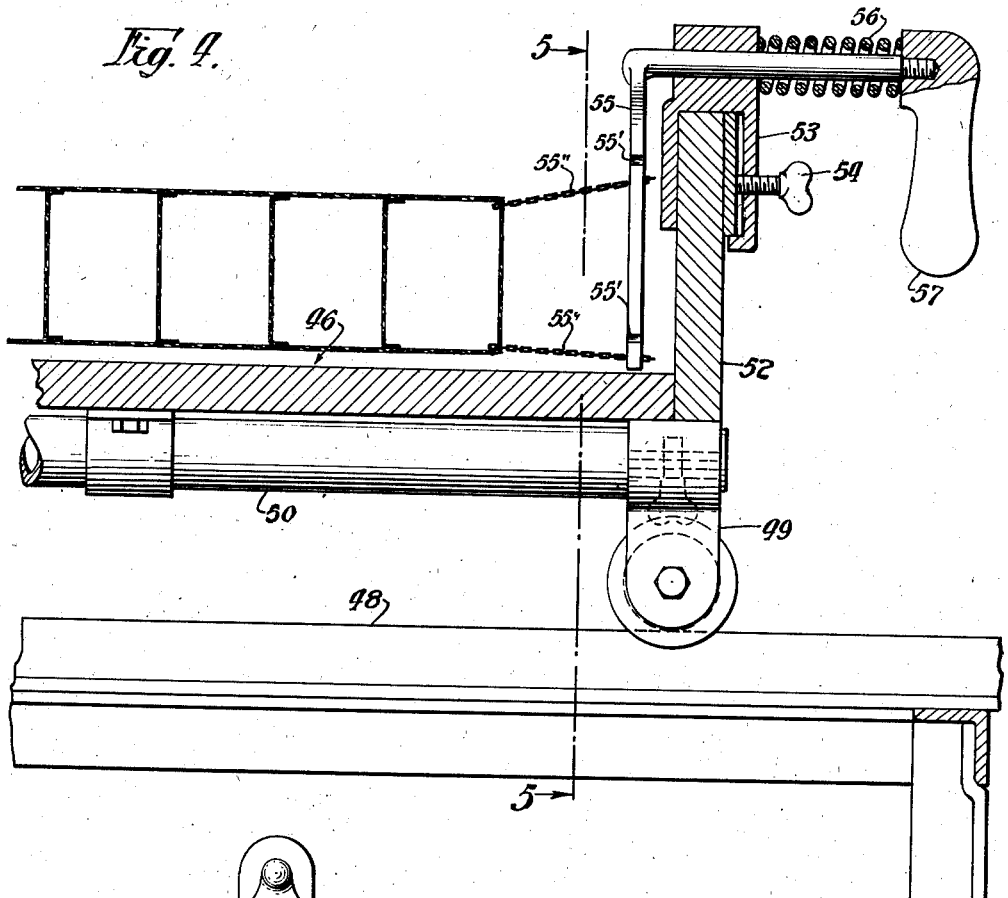
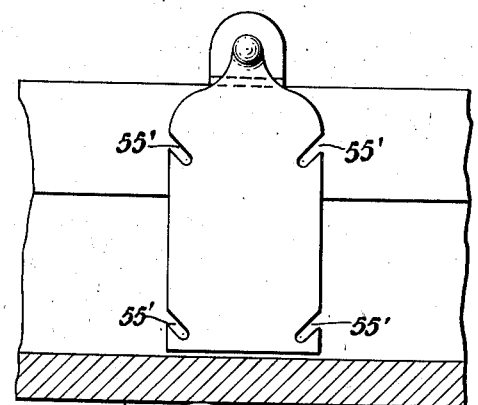
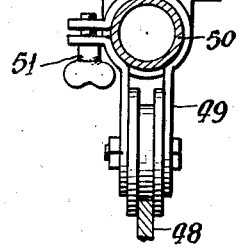

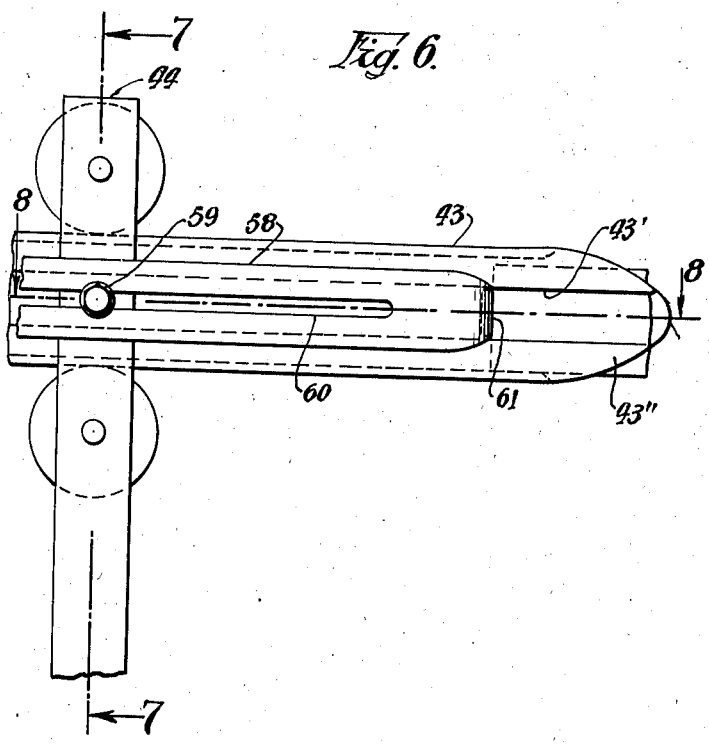
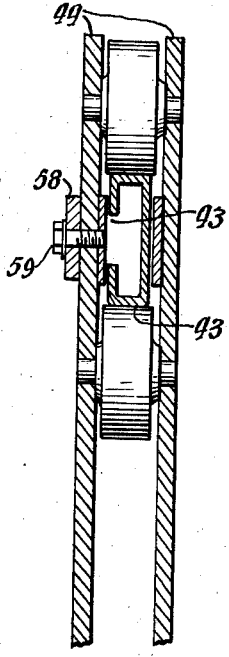
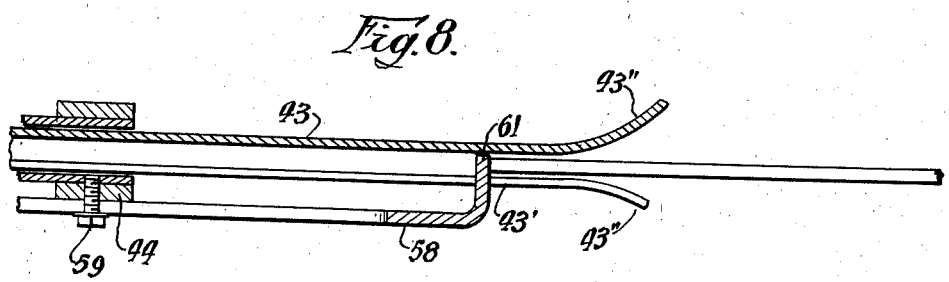

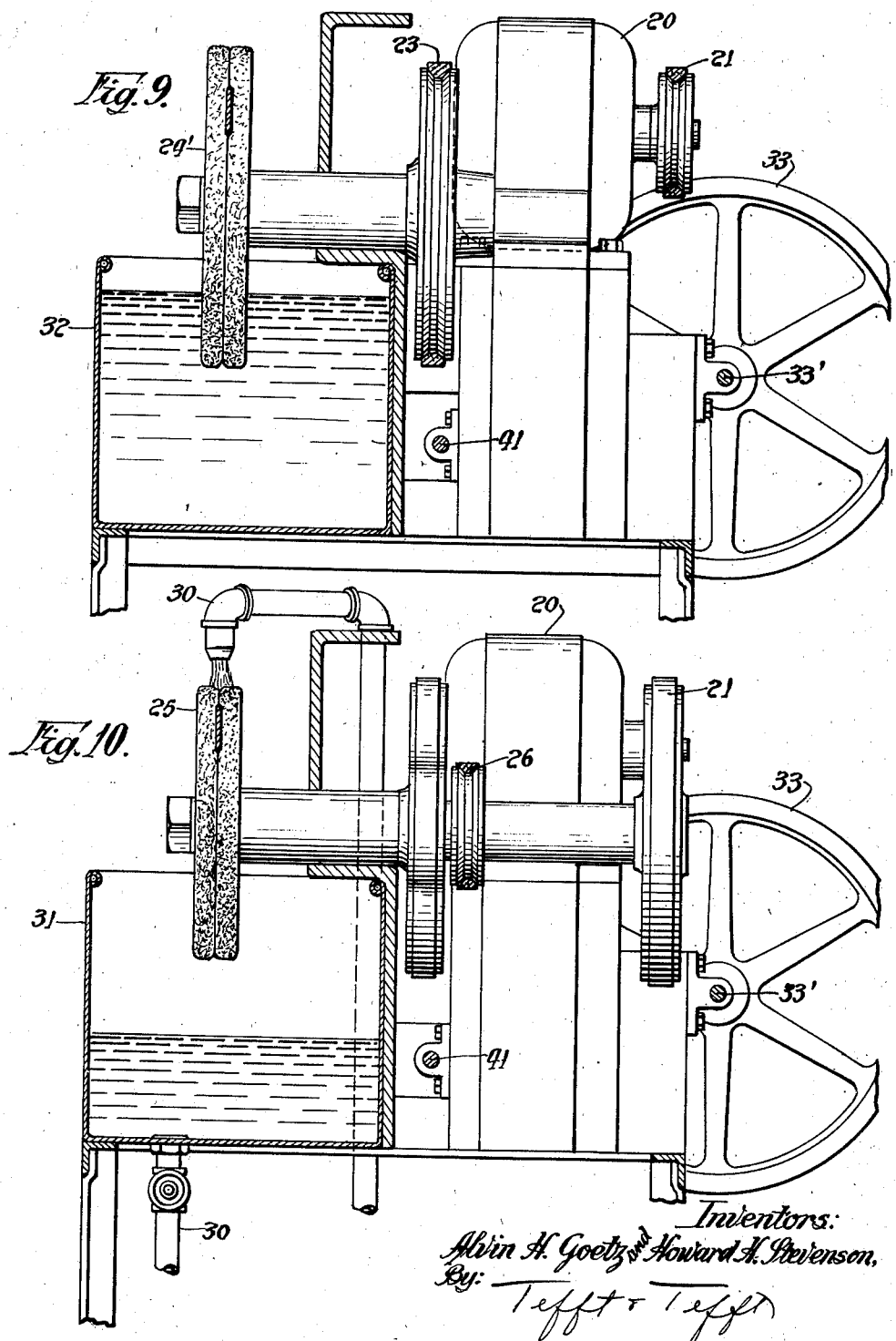

Nov. 25, 1941.   A. H. GOETZ ET AL   2,263,624
SLAT WASHING MACHINE
Filed June 22, 1938   8 Sheets-Sheet 7

Inventors:
Alvin H. Goetz & Howard A. Stevenson,
By: Tyft & Tyft
Attorneys.

Nov. 25, 1941.  A. H. GOETZ ET AL  2,263,624
SLAT WASHING MACHINE
Filed June 22, 1938  8 Sheets-Sheet 8

Inventors:
Alvin H. Goetz & Howard H. Stevenson,
By: Tefft & Tefft

Attorneys.

Patented Nov. 25, 1941

2,263,624

UNITED STATES PATENT OFFICE 2,263,624

SLAT WASHING MACHINE

Alvin H. Goetz and Howard H. Stevenson, Bloomington, Ill.

Application June 22, 1938, Serial No. 215,097

3 Claims. (Cl. 15—230)

This invention relates to a novel type special purpose machine for washing, rinsing and drying the slats for Venetian blinds and then replacing them in the tape holders in proper position for re-hanging.

The recent vogue for Venetian blinds has increased their usage tremendously. Blinds of this type are not only used in homes but are becoming standard equipment in hotels and office buildings. Many buildings use several hundreds of such blinds.

Exposed as they are in windows with almost continuous air currents, these blinds rapidly become soiled and then present a bad appearance. The cleaning of them by hand methods is extremely slow, costly and generally unsatisfactory. Hand methods usually result in streaked, spotted slats which seriously detract from their appearance.

The particular object of this invention is to provide a machine wherein the slats of Venetian blinds or the like could be thoroughly washed, rinsed, dried and replaced in their tapes with a minimum of effort and cost.

Another object is to provide means whereby the slats of such blinds can be removed from their tapes, permitting the tapes to be laundered and then refilled with the same slats in the same relative position in the tapes. It will be recognized that commercial laundering of such blinds should be done in a manner which would permit the same slats to be delivered to the original customer.

Although we have invented this machine for the particular purpose of washing slats of Venetian blinds, it is obvious that the same principles can be applied for other uses, and we do not desire to limit the scope of our invention to this single purpose.

Other objects and benefits will be disclosed by the following description and drawings in which:

Fig. 4 is an enlarged sectional view of the tape table as it would appear on the section lines 4—4 of Fig. 1;

Fig. 5 is an elevation view of a portion of the tape table as it would appear on the section lines 5—5 of Fig. 4;

Fig. 6 is an enlarged elevation view of the needle mechanism as it appears from the line 6—6 of Fig. 1;

Fig. 7 is a sectional end elevation view of the same needle mechanism as in Fig. 6 on the section lines 7—7;

Fig. 8 is a plan sectional view of the same needle mechanism as it appears in Fig. 6 on the section lines 8—8, showing particularly the adjustable slat stop;

Fig. 9 is an enlarged cross-sectional elevation view of the washing mechanism as it appears on the line 9—9 of Fig. 2;

Fig. 10 is a similar cross-sectional view to Fig. 9 showing the rinsing and drying mechanism as it would appear on the section lines 10—10 of Fig. 2;

Figure 1:
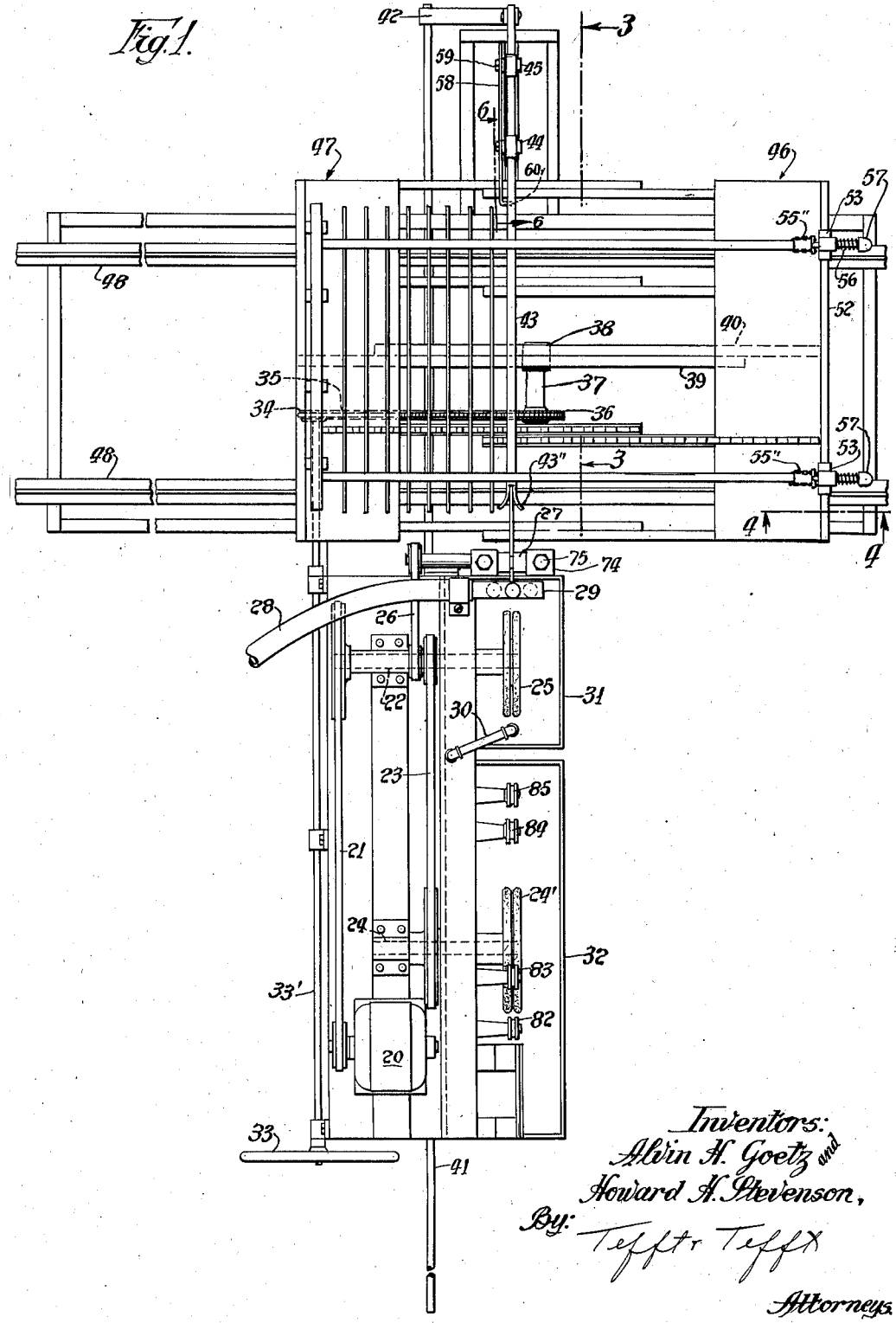
Fig. 1 is a plan view of our slat washing machine showing the various parts in their relative locations.
Figure 2:
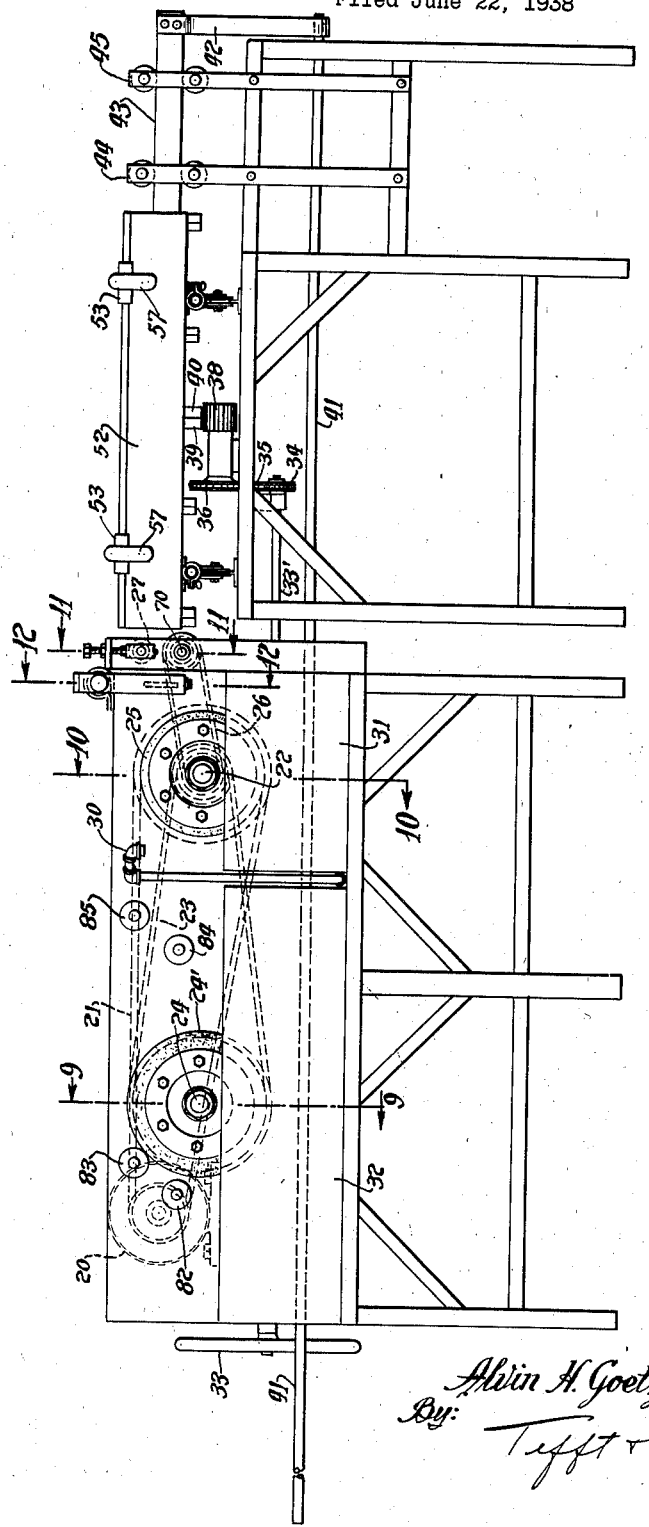
Fig. 2 is a side elevation view of the machine as shown in Fig. 1.

Now referring to Figs. 1 and 2, we designate an electric motor with the numeral 20. This motor through the belt 21 drives a jack shaft 22. The belt 23 driven from this jack shaft drives another shaft 24 on one end of which is mounted a washing wheel 24'. Similarly on the jack shaft 22 is a drying wheel 25. On the center of the jack shaft 22 is another belt drive 26 which rotates the drive rollers 27. Thus it will be seen that the entire washing mechanism is driven by the single motor 20.

By the numeral 28 we designate an air hose leading to a source of compressed air (not shown). On the end of this hose is mounted a drying nozzle 29. By the numeral 30 we designate the rinse spray which takes water from the rinse tub 31 and circulates it through the piping system 30 by means of a pump (not shown). The wash tub 32 contains a washing solution and the wash wheel 24' runs in this solution, carrying it over the slat as will be hereinafter described.

The detailed construction of the wash wheels 24' and 25, as well as the construction of the drying nozzle 29 and the drive rollers 27, will later be described in more detail.

Mounted on the left side of the frame work as shown in Fig. 1, is a hand wheel 33 driving a shaft 33' which has a sprocket 34 mounted on the opposite end. This sprocket wheel drives a chain 35 to another sprocket 36 which is mounted on a jack shaft 37 which has on its opposite end a rather wide spur pinion 38. This pinion meshes with dual rack bars 39 and 40 attached to the under side of the dual tape carriages generally designated as 46 and 47. By means of this last described mechanism the operator can slide the tape carriages forward or backward by rotating the hand wheel 33.

Slidably mounted underneath the mechanism as best shown in Fig. 2, is a rod 41 carrying a vertically extending arm 42 attached to a needle mechanism 43 which is slidably mounted in dual roller brackets 44 and 45. By means of this mechanism the operator can slide the needle 43 forward and backward by means of the rod 41.

Figure 3:
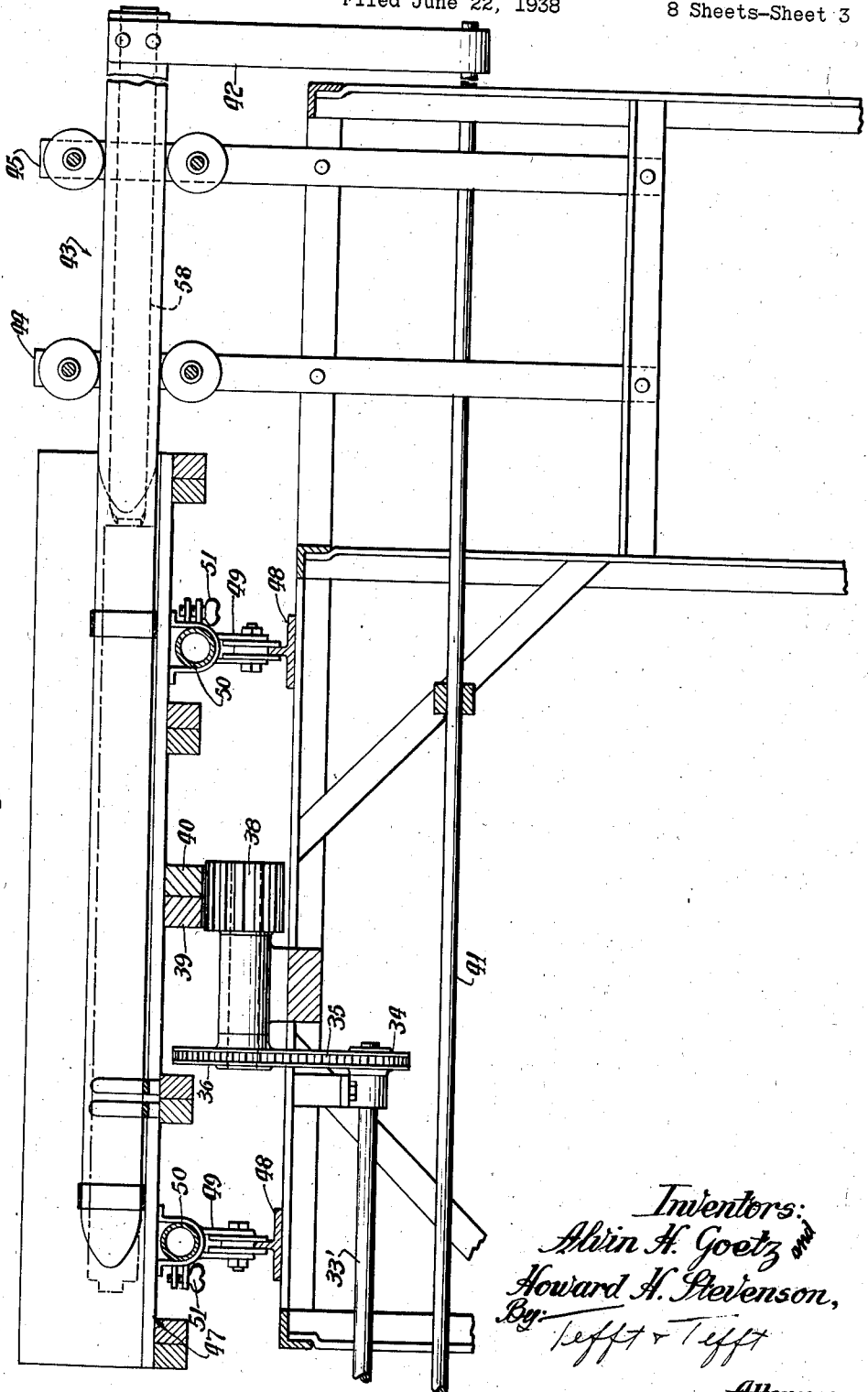
Fig. 3 is an enlarged sectional view of the tape table and needle mechanism as it would appear on the section lines 3—3 of Fig. 1.

Now referring to Fig. 3, T-bar rails 48 are mounted on the end frame and extend sidewise a sufficient length to carry the dual tables 46 and 47 the full range of any length blind. The dual tables 46 and 47 are supported on pipes 50 likewise running the full length of the longest blind. Attached to these pipes 50 are roller brackets 49 adjustably attached to the pipes 50 by the thumb screws 51. By means of this arrangement the overall length dual tables 46 and 47 may be adjusted for long or short blinds.

Now referring to Fig. 4, on the end of the table 46 is a vertical member 52 supporting dual clamp brackets 53 which are slidably or adjustably attached by means of the thumb screws 54. A chain bracket 55 extends downward from the bracket 53 and has four chain notches 55' by which the blind tapes are adjustably supported by chains 55". A compression spring 56 mounted between the bracket 53 and the handle 57 urges the chain bracket 55 outward and thus supports the blind tape by means of the tension of the spring 56. It will be appreciated that by this construction the dual tables 46 and 47 may be lengthened or shortened to fit any length blind and the brackets 53 may be adjusted sidewise to fit any width of tapes.

Now referring to Figs. 6, 7 and 8, it will be noted that the needle 43 is a hollow rectangular section having an open side 43' and the point of the needle being belled outward by removing the horizontal sections at the point and bending the side walls outward as shown at 43". This, of course, is done to permit easy entry of the slat. On the roller brackets 44 and 45 is mounted a stop 58. This stop is adjustably mounted by means of the bolts 59 through the slots 60. On the end of this stop an inwardly extending finger 61 projects through the opening 43' and thus the slat is stopped at any desired point with reference to the tape as is best shown in Fig. 1. It will be obvious that the stop member 58 is stationary on the roller brackets 44 and 45, whereas the needle 43 is movable at the will of the operator by means of the rod 41.

Now referring to Fig. 9, it will be seen that the tank 32 holding the washing solution has a water level considerably above the lower edge of the scrub wheel 24'. It will be obvious that as this wheel revolves, the washing solution is picked up and applied practically on all sides of the slat.

Again referring to Figs. 1 and 2, it will be noted that there are four guide rollers 82, 83, 84 and 85. These rollers are necessary to prevent the slat being picked up and carried around the wheels 24' and 25. They are positioned in such a manner as to not only hold the slat but to permit it being moved forward through the wheels by the rotation of the wheels and the attrition of the fabric on the slats. It will be noted that this forward movement is both assisted and retarded by the action of the wheels. However, the resultant action is to move the slat forward but not nearly as rapidly as the peripheral speed of the wheels. From this it will be obvious that a definite scrubbing action is given the slat.

In Fig. 10 it will be seen that the level of the rinse water is considerably below the lower edge of the drier wheel 25. The water in the tank 31 is merely circulated as a rinse through the nozzle 30 and the wheel 25 merely removes all excess water. The slat then is actually dried by the air blast through the hose 28 and the nozzle 29.

Figure 13:
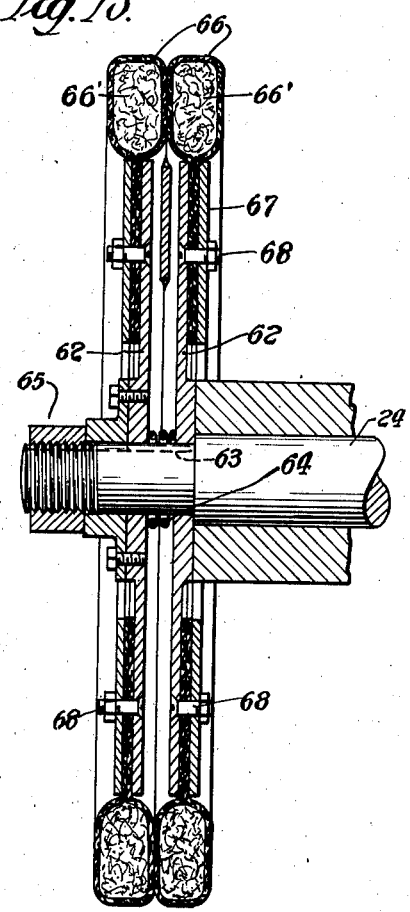
Fig. 13 is an enlarged cross-sectional view of the washing wheel.
Figure 14:
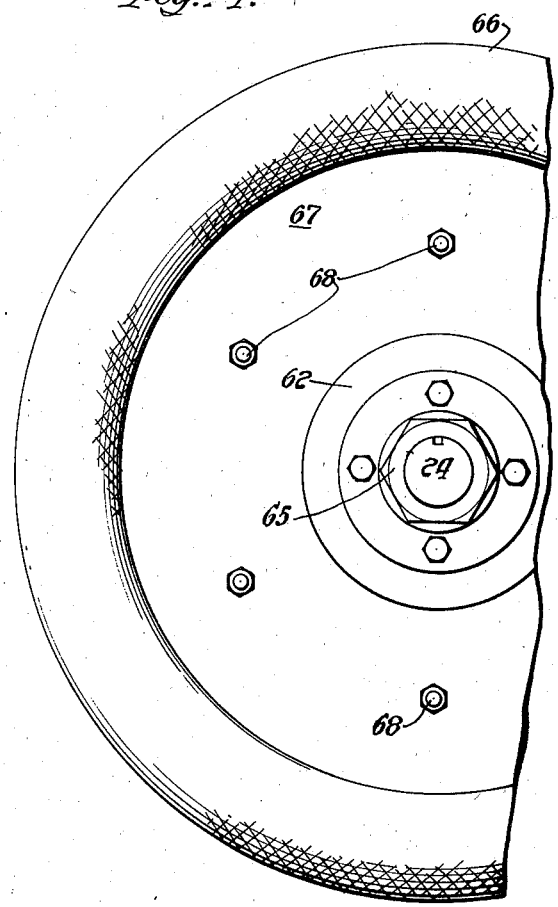
Fig. 14 is a broken end elevation view of the same washing wheel as shown in Fig. 13.

Now referring to Figs. 13 and 14, we show the construction of the wheels. Two keyed flange members 62 are mounted on the drive shaft and keyed slidably to the shaft by the keys 63. A compression spring 64 mounted between these flange members urges them apart but such action is restrained by the adjusting nut 65. By this structure it is obvious that the distance between the flanges can be controlled by the nut 65 and harder or lighter pressure on the slat adjusted by the operator. Looped cloth members 66 filled with resilient material 66' are attached to the flange members 62 by ring clamps 67 and bolts 68. It will be apparent that by this structure we have a yielding resilient fabric rim member which can be held in close attrition to the slat in order to scrub it thoroughly. Both wheels are constructed in an exactly similar manner although as before noted, the wheel 25 is a drying wheel, not a scrubbing wheel.

Figure 11:
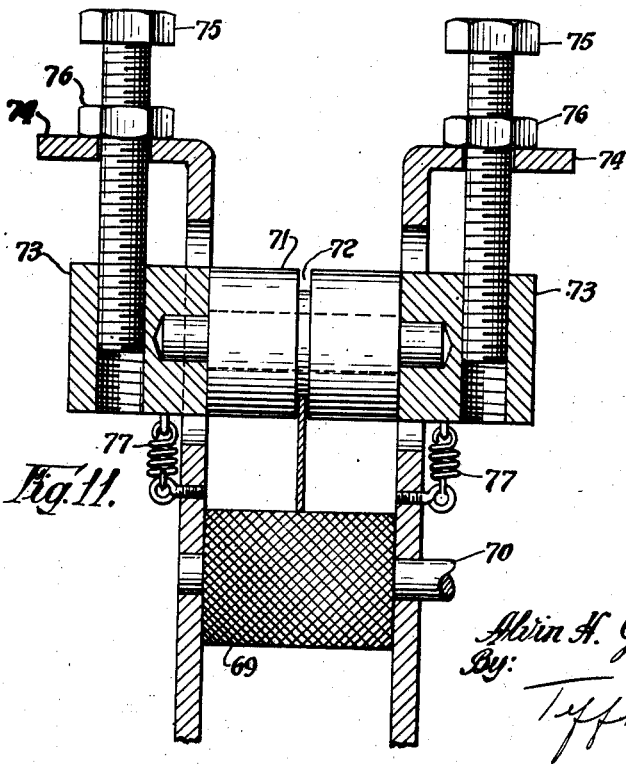
Fig. 11 is an enlarged cross-sectional elevation view of the slat feed rollers as they would appear on the section lines 11—11 of Fig. 2.

Now referring to Fig. 11, we show the detail of the roller drive member designated 27 in Figs. 1 and 2. The drive roller 69 is driven from a shaft 70 by the belt 26 as shown in Fig. 1. A grooved roller 71 is slidably mounted in the brackets 74 by cap screws 75 threaded into the supporting bearing member 73. The springs 77 urge this roller downward to hold the slat on edge by means of the groove 72. The fit of the groove 72 on the slat may be adjusted by rotating the cap screws 75 and varying the distance between the head of the cap screws 75 and the lock nuts 76. The cap screws 75 are not tapped in the bracket member 74 but have a sliding fit in the holes.

Figure 12:
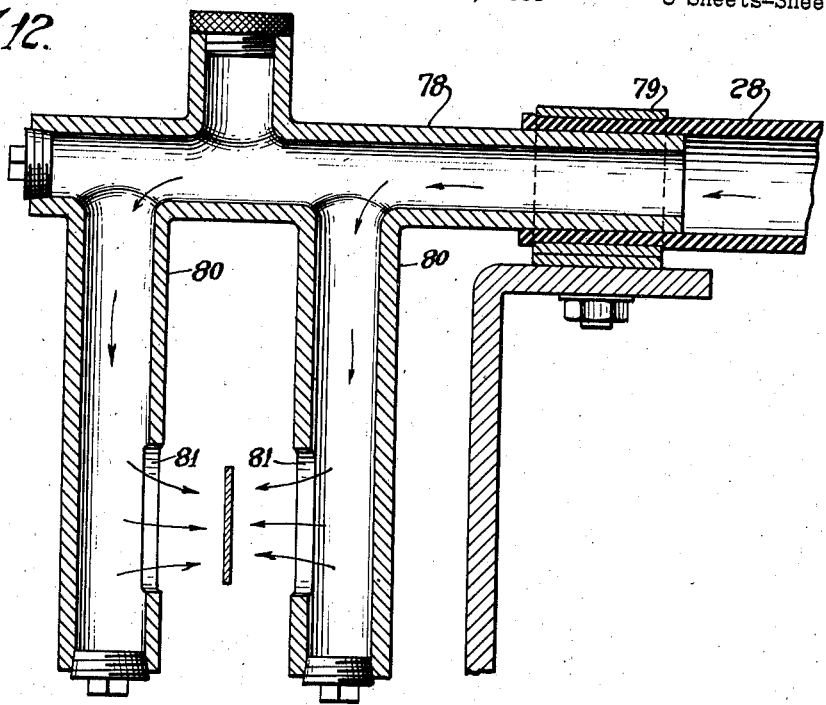
Fig. 12 is an enlarged cross-sectional elevation view of the nozzle as it would appear on the section lines 12—12 of Fig. 2.

Now referring to Fig. 12, the air nozzle generally designated in Figs. 1 and 2 by the numeral 29 has a horizontal tubular member 78 which fits in the inside of the hose 28 and is held on the machine by the clamp member 79. Two downwardly extending tubular members 80 have orifices 81 which direct the incoming air on both sides and around the slat to dry it thoroughly. Under some conditions we have used heated air to advantage.

Having thus explained the structural details of our machine, we will now explain its operation.

Referring to Figs. 1 and 2, the tape tables 46 and 47 have been adjusted lengthwise to fit the tapes as shown. This was done by loosening the thumb screws 51 and sliding the tables apart on the tube 50 to proper position when the thumb screws were set. One end of the blind was fixed on the table 47 by means of clamps 47'. The other end was stretched from table 46 by adjusting the brackets 53 in proper position, pushing in on the handle 57, adjusting the chains 55" in the slots 55', whereupon the springs 56 stretched the tape in position as shown.

The tape tables were then moved to proper indicating position by the hand wheel 33. The needle 43 was then inserted through the tapes in proper position to receive the slats by means of the rod 41. The positioning of the tapes as above indicated is merely done by the eye of the operator. The slats which have been taken out of this particular set of tapes have been stacked alongside of the machine and the operator now starts the machine by closing the circuit to motor 20. The scrubber wheel 24' and the drier wheel 25 are now rotated. The operator now turns on the pump to circulate the rinse water through the nozzle pipe system 30 and the compressed air source to drive air through the hose 28. By inserting the slat between the rollers 82 and 83 they now enter the scrubber wheel 24' which is rotating. It picks up washing solution from the tank 32 and the fabric rim of the wheel 66 now thoroughly scrubs the slat as it passes through. As before explained, the resultant rotary action of the wheel 24' gradually drives the slat forward and through the guide rollers 84 and 85 and the slat is now being rinsed from rinse water through the nozzle 30. The slat now enters the drier wheel 25 which rubs off all excess water and the balance of the water is driven off by the air blast through the hose 28 coming out of the orifices 81 on the slat. The drive roller 69 and roller groove 72 now pick up the slat and direct it to the inside of the needle 43 through the bell lips 43". After the slat has been driven into the needle, the operator now moves the needle backward by pushing on the rod 41, whereupon the stop 61 ejects it from the needle and positions it in the tape as shown. The operator now indexes the tape to the next position, ready to receive the following slat which has already been inserted in the machine and is about to be discharged. From this description it is obvious that the slats can be washed and positioned in the tapes continually, thus effecting thorough and rapid washing of the slats and assembling of the blind.

Having thus described our invention, we now claim as new:

1. A slat washing device for Venetian blinds comprising a spindle, a pair of dual scrubbing wheels mounted on said spindle in keyed relationship therewith, each of said dual scrubbing wheels consisting of a thin circular disk, a ring clamp removably secured to said disk, and a peripheral resilient rim portion secured to the disk by the ring clamp; said resilient rim portion consisting of a yieldable pad enclosed by an annular fabric loop having its inner edges clamped between th ecircular disk and the ring clamp.

2. A slat washing device for Venetian blinds comprising a spindle, a pair of dual scrubbing wheels mounted on said spindle in keyed relationship therewith, and in pressure contact on the inner faces of the dual rim portions, and an adjustment device arranged to adjust the pressure contact of said rim portions; the aforementioned dual scrubbing wheels including a peripheral rim portion comprising a resilient pad, and said adjusting device including a screw portion on the outer end of the spindle, a spring on the spindle between the wheels, and an adjusting nut on the screw portion.

3. A slat washing device for Venetian blinds, comprising a spindle, and a pair of dual scrubbing wheels mounted on said spindle in pressure relationship with each other; each of said scrubbing wheels including a central disk and a peripheral rim portion comprising a resilient pad mounted thereon; said pads overhanging the inner opposed surface of the mounting disks and having the necessary resiliency to envelop slats passing between the said mounting disks.

ALVIN H. GOETZ.
HOWARD H. STEVENSON.